Oct. 20, 1931.  T. C. TORGERSON  1,828,628
BABY BOTTLE STEAM HEATER
Filed Nov. 23, 1928
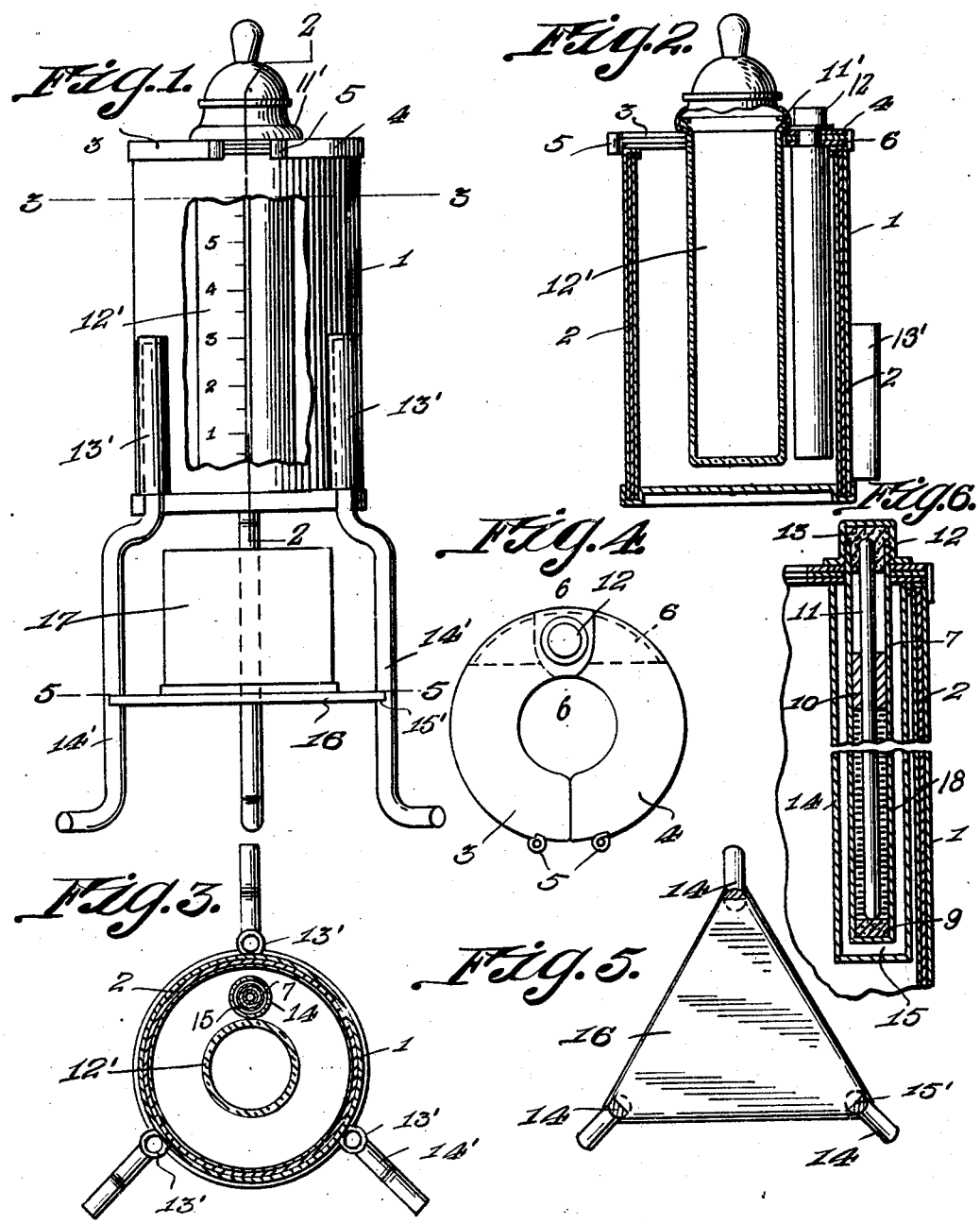
Theodore C. Torgerson,
INVENTOR
BY Victor J. Evans
ATTORNEY Patented Oct. 20, 1931

1,828,628

UNITED STATES PATENT OFFICE

THEODORE C. TORGERSON, OF ALEXANDER, NORTH DAKOTA

BABY BOTTLE STEAM HEATER

Application filed November 23, 1928. Serial No. 321,497.

My present invention has reference to a heating device for the nursing bottles of infants and my primary object is the provision of a device for this purpose which includes a water receptacle through whose top the milk containing bottle is insertible and is sustained from contact with the bottom of the receptacle, said receptacle being provided with detachable supporting legs which are notched for the reception of a shelf or plate that serves as a rest for the burner or heating element and further wherein the receptacle is provided with a removable thermometer whereby the temperature of the water in the receptacle may be ascertained.

A further object is the provision of a device of this class in which the parts constituting the same are removable, so that the improvement will occupy only a small space when not required for use and further wherein the parts when associated are self-sustaining.

A still further object is the provision of a device for this purpose in which the tubular casing or receptacle for a thermometer provides a hinge for the closure of the water in which the bottle containing the milk is inserted.

To the attainment of the foregoing and other objects which will present themselves the invention resides in the improvement hereinafter described and definitely claimed.

In the drawings:

Figure 1 is a side elevation of the improvement, a portion of the receptacle being broken away.

Figure 2 is a sectional view approximately on the line 2—2 of Figure 1.

Figure 3 is a sectional view approximately on the line 3—3 of Figure 1.

Figure 4 is a top plan view of the improvement.

Figure 5 is a sectional view approximately on the line 5—5 of Figure 1.

Figure 6 is a sectional view approximately on the line 6—6 of Figure 4.

As disclosed by the drawings I employ a cylindrical receptacle 1. Preferably the receptacle is formed of inner and outer sheets that have interposed therebetween an insulator 2. The bottom of the receptacle is closed but the top thereof has hinged thereto two flat semi-cylindrical flanged members 3 and 4 that provide the closure for the water receptacle 1. One or both of the closure members 3 and 4 may be provided with a handle element 5 whereby the said closures may be swung to open or to closed positions. The laping ends of the closures 3 and 4 rest on a ledge plate 6 fixed in the mouth of the receptacle. The ledge plate 6 has an opening therethrough which alines with similar openings in the lapping portions of the closure plates 3 and 4 and passing through these openings there is a tubular member 7 that has its lower end closed. The tubular member 7 thus provides the hinge pintle for the closure members 3 and 4. The member 4 may be fastened to the wall that surrounds the opening in the ledge plate and may be formed with an annular lug to overlie the outer closure plate. The tube 7 projects a suitable distance above the closure and is threaded. The tube 7 may have arranged therein a liquid 18 and has disposed upon its bottom a cushioning element in the nature of a cork 9. Also in the tube 7 there is a cylindrical apertured cork member 10 that affords a guide for a thermometer 11. The thermometer has its outer end slightly projected beyond that of the tube 7 so that the same may be raised through the said tube for inspection or may be readily inserted therein. When the device is not employed for heating milk in a manner which will presently be described, there is screwed on the threaded end of the tube 7 a cap member 12 that has an inner cork or like compressible facing 13 to contact with the outer end of the thermometer. Secured on the ledge plate, depending therefrom and receiving the tube 7 therein there is an outer tube 14. This tube provides a dead air or vacuum space 15 between its inner wall and the outer periphery of the tube 7, the purpose of which arrangement will presently be apparent.

As disclosed by Figures 1 and 2 of the drawings, the neck or beaded end 11′ of an infant's milk containing bottle 12′ is engaged by the closures 4 and 3 when arranged in the receptacle, and this engagement prevents the bottom of the bottle 12' contacting with the bottom of the receptacle. Obviously the receptacle 1 is designed to contain a certain quantity of water.

From its bottom the receptacle is formed or provided with inwardly directed sockets 13. Obviously any desired number of these sockets may be provided and the inner ends of the sockets are closed. These sockets are adapted to receive therein the straight upper ends of the supporting legs 14' of the improvement. While in the drawings I have illustrated only three equidistantly spaced legs 14' and three equidistantly spaced sockets 13', it is obvious that a larger number of legs and sockets may be provided. The legs 14' have their inner faces, at a suitable distance below the receptacle 1, notched, as at 15'. The notches are designed to receive therein the corners of a shelf 16. The coengagement of the shelf with the legs hold the legs properly positioned and the shelf 16 is designed to provide a support for a burner 17 which is preferably in the nature of a can of inflammable material.

From the foregoing description when taken in connection with the drawings it will be obvious that the flame from the heating element 17 will boil the water in the receptacle 1 and heat the milk in the bottle 12' to a desired temperature.

The air space provided between the tubes 7 and 14 permits of the thermometer 11 being heated, and by withdrawing or partly withdrawing the thermometer from the tube 7 the degree of temperature of the water therein heated may be ascertained. The tube 7 contains a small amount of fluid which is much less than the amount of milk in the milk bottle located in the receptacle 1 and to prevent the fluid in the tube 7 from heating quicker and to a higher degree of temperature than the milk, the dead air space 15 is provided. The fluid in the tube 7 conducts the heat from said tube to the thermometer.

The simplicity of the improvement and the advantages thereof will, it is thought, be understood and appreciated when taken in connection with the accompanying drawings. It is to be stated, however, that I do not wish to be restricted to the precise details herein set forth and, therefore, hold myself entitled to make such changes therefrom as fairly fall within the scope of what I claim.

Having described the invention, I claim:

1. In a device for the purpose set forth, a cylindrical receptacle, a hinged closure for the top of the receptacle including arcuate shaped members to engage about the beaded neck of a milk bottle, and an insulated housing for a removable thermometer pivotally connecting the arcuate shaped members of the hinged closure.

2. In a device for the purpose set forth, a water receptacle, flanged arcuate shaped closure plates for the receptacle and over-lapping each other at one of their ends, a ledge plate in the receptacle on which the lapping ends of the closure plates rest, a tube having a closed bottom and an open top passing through the closure plates and through the ledge plate and providing a pintle for the closure plates, a compressible element in the bottom of the tube, a cylindrical compressible element in the tube providing a guide for a removable thermometer, a cap screwed on the outer end of the tube, a second tube fixed to the ledge plate and surrounding the first mentioned tube and providing an air space therebetween.

In testimony whereof I affix my signature.

THEODORE C. TORGERSON.